United States Patent [19]

Abbott

[11] 4,430,465

[45] Feb. 7, 1984

[54] ASPHALT COMPOSITION

[75] Inventor: Clifford E. Abbott, Norton, Ohio

[73] Assignee: Phillips Petroleum Company, Bartlesville, Okla.

[21] Appl. No.: 360,303

[22] Filed: Mar. 22, 1982

[51] Int. Cl.³ .................. C08L 95/00; B32B 27/08
[52] U.S. Cl. .................. 524/64; 524/59; 524/68; 524/62; 428/291; 428/289
[58] Field of Search .............. 524/64, 59, 68, 62; 428/291, 289

[56] References Cited

U.S. PATENT DOCUMENTS

| | | | |
|---|---|---|---|
| 2,534,713 | 12/1950 | Hankins | 106/273 N |
| 3,047,414 | 7/1962 | Katz | 106/273 N |
| 3,096,191 | 7/1963 | Pitchford | 106/275 |
| 3,096,192 | 7/1963 | Pitchford | 106/281 R |
| 3,129,106 | 4/1964 | Katz | 106/273 N |
| 3,235,522 | 2/1966 | Carr | 524/59 |
| 3,474,625 | 10/1969 | Draper et al. | 405/270 |
| 3,611,888 | 10/1971 | Kavallr et al. | 404/47 |
| 3,864,157 | 2/1975 | Bresson et al. | 427/202 |
| 3,931,439 | 1/1976 | Bresson et al. | 428/289 |
| 3,953,974 | 5/1976 | Bresson et al. | 405/270 |
| 4,115,335 | 9/1978 | Reusser et al. | 524/68 |
| 4,158,371 | 6/1979 | Reusser et al. | 138/145 |
| 4,196,115 | 4/1980 | Bresson | 524/68 |
| 4,217,259 | 8/1980 | Bresson | 524/68 |

OTHER PUBLICATIONS

The Function and Chemistry of Asphalt Additives, Huber and Thompson (Amines Added to Asphalt), pp. 374–386.

Rubber World Blue Book, 1981 (Escorez 2101 disclosed on p. 176).

*Primary Examiner*—Maurice J. Welsh
*Assistant Examiner*—M. L. Moore

[57] ABSTRACT

An asphalt composition is made by mixing together asphalt, at least one alkadiene-vinylarene copolymer, a petroleum hydrocarbon resin and an amine-based antistripping agent. A fibrous mate can be coated with the above-described composition to produce an article useful for road repair applications and waterproofing purposes.

16 Claims, No Drawings

ASPHALT COMPOSITION

This invention relates to a novel composition. This invention further relates to a composition of improved adhesive properties. This invention also relates to an article of manufacture comprising a mat of fibers coated with the novel composition.

BACKGROUND AND SUMMARY OF THE INVENTION

Asphaltic mastics and fibrous mats coated therewith are employed in a number of applications such as, for example, road repair and waterproofing. The adhesive strength of these materials is an important factor in determining fitness and suitability for use. Of particular concern is the effect of water on the asphaltic mastic after exposure for extended periods of time since water exposure necessarily follows from many of the intended uses of the material. Good peel and shear strengths are desired properties since the mastic's ability to maintain a fixed position relative to its immediate environment directly affects the quality and duration of the repair or other application.

Accordingly, it is desired to make and use asphalt compositions that possess good peel and shear strength.

Primers, such as cutback asphalt or a rubber-tackifier resin system in a hydrocarbon solvent, are frequently needed in applying asphaltic mastics and mastic-coated fibrous mats to their intended substrates. The primer is generally coated onto the substrate to prepare it for the asphaltic mastic or the mastic-coated fibrous mat. The need for a primer requires an extra step in, for example, the road repair or waterproofing process. This necessarily requires additional time, labor and materials. It may be difficult to determine how much primer to use and problems may arise from using too little or too much primer. Health and environmental problems can also be created by the evaporation of hydrocarbon solvents used in many primers. It is, therefore, desired to make and use asphalt compositions that do not require pretreatment of the intended substrate surface with a primer.

In brief summary the composition of this invention is comprised of (a) asphalt, (b) at least one alkadiene-vinylarene copolymer, (c) at least one petroleum hydrocarbon resin, and (d) at least one amine-based antistripping agent. The composition may optionally contain an extender oil, mineral fillers or antidegradants. When the above-identified ingredients are mixed together the asphalt compositions of the present invention are produced.

The asphalt compositions of this invention possess the characteristics previously identified as desirable in asphalt compositions in general. The asphalt compositions of this invention will exhibit good peel and shear strengths and an especially impressive retention of those adhesive properties after extended exposure to water. The asphalt compositions of this invention find further advantage in their ability to bind to a substrate without the need of a primer. This primer-free utility of the asphalt compositions of this invention not only represents savings in terms of time, labor and cost by obviating the need for a primer application step but also promotes and advances health and environmental concerns by eliminating the use of primar hydrocarbon solvents.

These asphalt compositions can be used as "mop-on" type waterproofing membranes by applying the composition to surfaces of asphalt, concrete, metal and the like. Examples of specific "mop-on" applications include, but are not limited to, the treatment of building foundations, bridge decks and parking decks. The asphalt compositions are also useful as roof and road repair material that can be applied directly to cracked or weakened areas. A wide range of other applications will be readily apparent to those of ordinary skill in the art.

In the preferred embodiment of this invention the asphalt composition is applied to at least one side of a fibrous mat to produce an asphalt-coated fabric possessing the advantages of the present invention. The utility of these coated fabrics is multifaceted and can be illustrated by a few examples. The coated fabrics can be placed between an existing road in need of repair and a new overlay of asphalt cement to prevent reflection cracking (i.e. the propagation of the underlying cracks through the new overlay of asphalt cement). The coated fabrics can be used to cover seams in new concrete highways before overlaying with asphalt cement. The coated fabrics can be used to waterproof bridge decks, parking decks and building foundations. They are also useful as pond liners and roofing sheets. Numerous other uses and applications will be readily apparent to those of ordinary skill in the art.

OBJECTS

It is an object of this invention to provide a novel asphalt composition possessing improved adhesive properties.

It is another object of this invention to provide a novel asphalt composition that does not require primer pretreatment of the intended substrate surface.

It is a further object of this invention to provide a coated fiber mat useful for repair and waterproofing purposes.

These objects and other objects and advantages will be apparent to those of skill in the art from a study of this disclosure and of the appended claims.

DETAILED DESCRIPTION

The asphalt employed in this invention can be any of the well known bituminous substances derived from a number of materials such as, for example, petroleum, shale oil, coal tar and the like. Asphalt is a thick, viscous mixture of compounds such as, for example, paraffinic, cycloaliphatic and aromatic hydrocarbons and lesser amounts of heterocyclic compounds containing sulfur, nitrogen or oxygen. Although asphalt can be obtained from natural sources it is primarily derived as the residue of petroleum distillation (e.g. the bottom product of a vacuum distillation of a topped crude). Although this invention is not limited thereto, it is presently preferred that the asphalt have a penetration (ASTM D5) at 77° C. ranging from about 50 to about 250 and more preferably from about 110 to about 130.

The alkadiene-vinylarene copolymers suitable for use in this invention are derived from alkadiene monomers and vinyl-substituted aromatic monomers. The copolymers can be linear or branched. They can be random copolymers or block copolymers. At the option of the practitioner the copolymers can be partially or substantially hydrogenated. Thermoplastic block copolymers are presently preferred.

Suitable alkadiene monomers used to produce the alkadiene-vinylarene copolymers are the unsaturated hydrocarbons containing at least two double bonds.

The alkadiene monomers may be straight-chained (e.g. 1,3-butadiene) or cyclic (e.g. cyclopentadiene) but straight-chained is preferred. It is also preferred that the alkadiene monomer be conjugated (e.g. 1,3-butadiene) as opposed to unconjugated (e.g. 1,2-butadiene). Although the alkadiene monomer can contain any number of carbon atoms it is contemplated that the alkadiene monomer will ordinarily in the practice of this invention contain from 4 to 12 carbon atoms. Those containing from 4 to 8 carbon atoms are especially preferred. Examples of suitable alkadiene monomers include 1,3-butadiene, isoprene, 2,3-dimethyl-1,3-butadiene, piperylene, phenyl-1,3-butadiene, 1,3-pentadiene, 2-ethyl-1,3-pentadiene, 1,3-hexadiene, 2-methyl-1,3-undecadiene, 2-methyl-3-isopropyl-1,3-butadiene, and the like.

Suitable vinylarene monomers used to produce the alkadiene-vinylarene copolymers are the vinyl-substituted aromatic hydrocarbons which may include a single aromatic ring or more than one aromatic ring. Monovinyl-substituted aromatic hydrocarbons containing any number of carbon atoms can be employed but those containing from 8 to 18 carbon atoms are preferred. Exemplary vinylarene monomers include styrene, 3,5-diethylstyrene, 4-n-propylstyrene, 4-cyclohexylstyrene, 4-phenylstyrene, 4-methoxystyrene, 3-pentoxystyrene, 2,4,6-trimethylstyrene, 4-decylstyrene, 1-vinylnaphthalene, 8-phenyl-1-vinylnaphthalene, 3-benzylstyrene, and the like.

The preparation of alkadiene-vinylarene copolymers is well known in the art. The reader is invited to examine U.S. Pat. Nos. 3,281,383 and 3,639,521, incorporated by reference herein, for a more detailed discussion.

1,3-butadiene-styrene and isoprene-styrene copolymers are presently preferred. Linear block and radial teleblock 1,3-butadiene-styrene copolymers containing from about 10 to about 50 weight percent of bound styrene are the most preferred.

The inventive composition need not be limited to a single alkadiene-vinylarene copolymer but rather may include two or more of the above-described copolymers. The preferred embodiment of this invention includes a 1:2 weight ratio mixture of Solprene ®411 and Solprene ®1205, both of which are manufactured by the Phillips Chemical Company of Bartlesville, Okla. Solprene ®411 is a radial teleblock 1,3-butadiene-styrene copolymer with a bound styrene content of about 30 weight percent, a number average molecular weight Mn of about 220,000 and a vinyl content (1,2 addition mode) of about 11 percent. Solprene ®1205 is a linear 1,3-butadiene-styrene copolymer with a bound styrene content of about 25 weight percent (of which about 18 weight percent is present as a polystyrene block), a number average molecular weight Mn of about 65,000 to 70,000, and a vinyl content of about 9 percent. The above number average molecular weights were determined from gel permeation chromatography curves by a procedure described by G. Kraus and C. J. Stacy, J. Poly. Sci A-2, 10, 657 (1972) and J. Poly Sci. Symposium No. 43, 329 (1973) using tetrahydrofuran as the solvent.

Suitable petroleum hydrocarbon resins are the unsaturated synthetic polymeric products derived from variable mixtures of unsaturated monomers obtained as volatile by-products in the cracking of natural gas, gas oil or petroleum naphthas. These unsaturated monomers include, for example, olefins (such as pentenes, hexenes and heptenes), diolefins (such as pentadienes and hexadienes), cyclic olefins (such as cyclopentene and cyclohexene), cyclic diolefins (such as cyclopentadiene, methylcyclopentadiene and cyclohexadienes), cyclic diolefin dimers (such as dicyclopentadiene and methylcyclopentadiene dimer), and vinyl aromatic hydrocarbons (such as styrene, α-methylstyrene, vinyltoluenes, indene and methylindenes). It is known that these mixed unsaturated monomers can undergo addition-type polymerization by cationic initiation to form petroleum hydrocarbon resins. These petroleum hydrocarbon resins, which can range from brittle solids to viscous liquids, are generally lower in molecular weight than polyethylene, polypropylene, polybutadiene, polystyrene and the like. A more detailed description of suitable petroleum hydrocarbon resins can be found in the Encyclopedia of Polymer Science and Technology, Volume 9, 1968, John Wiley and Sons, pages 853–860, incorporated by reference herein.

The presently preferred petroleum hydrocarbon resins are those prepared by polymerization of diolefin fractions and aromatic petroleum fractions. The presently most preferred petroleum hydrocarbon resin is derived from piperylene (1,3-pentadiene) and indene monomers. Such a resin, marketed as Escorez ®2101 by Exxon Chemical Americas, Houston, Tex., has a specific gravity at 20° C. of about 1.02 (ASTM D71), a Ring and Ball softening point of about 90°–96° C. (ASTM E28), a melt viscosity of about 300 cP at 160° C. (ASTM D 3236), a number average molecular weight Mn of about 525 and a weight average molecular weight Mn of about 925 according to an Escorez 2101 Bulletin, Reference 97618, issued June 1980 by Exxon Chemical Americas.

The anti-stripping agent employed in the composition of the present invention is a highly branched organic amine preferably an aliphatic or cycloaliphatic branched organic amine having a molecular weight ranging from about 200 to about 500 and more preferably from about 350–400. In practice the anti-stripping agent can be and usually will be a mixture of these aliphatic and cycloaliphatic branched organic amines. Examples of suitable amines include hexadecyldibutylamine, trioctylamine, tri(1-methylheptyl)amine, tri(6-methyl)amine, tris(2-ethylhexyl)amine, N-octyl-1-hexadecamine, N-hexyl-1-octadecamine, methyldidodecylamine, 3-methylbutyl-bis(3,7-dimethyloctyl)amine, octadecyldibutylamine, N-octyl-1-octadecamine, and trinonylamine.

The presently preferred anti-stripping agent contains, in addition to a mixture of aliphatic and cycloaliphatic branched organic amines, at least one or more lower molecular weight (preferably less than about 200) alcohol, ether and/or ketone. It is further preferred that these alcohols, ethers and ketones be characterized by the presence of cycloalkyl groups, particularly cyclohexyl and cyclopentyl groups. Examples include methyl cyclopentanol, dicyclohexyl ether, and cyclohexenylcyclohexanone. The presently most preferred anti-stripping agent is marketed as Pave-Bond AR ™ by Cincinnati Milacron, now Carstab Corporation, Reading, Ohio.

The scope of this invention does not exclude the presence of other compounds in the anti-stripping agent. Low concentrations of compounds including, for example, phenol, cyclohexandiol, hydroxy cyclohexanone, dimethyl dicyclohexyl, alkyl alkenyl ether, bicyclohexyl, and octahydrodibenzofuran, for example, are contemplated to be optional in the practice of this invention.

The compositions of this invention can optionally contain mineral fillers such as, for example, silicates, carbonates, or mineral aggregates (e.g. sand, chat, screened pebbles or rock). The fillers help control viscosity, reduce cost, improve durability and facilitate the coating of the composition onto the fabric. The preferred filler is ground sand having a particle size of about 300-350 mesh.

The compositions of this invention can also contain an extender oil, preferably a naphthenic or aromatic hydrocarbon oil having a specific gravity of about 0.89-1.05, such as Sundex 790 marketed by Sun Oil Company. The extender oil improves the wetability (i.e. reduces viscosity) of the compositions thereby creating better contact with the substrate and improving adhesion thereto.

In addition, the compositions of the invention can and generally should contain one or more antidegradants such as antioxidants or antiozonants or an extreme pressure agent with antioxidant characteristics such as lead dialkyldithiocarbamate. The preferred antioxidants are marketed as Vanlube ®71 and Ageright Stalite ®.

The composition of this invention can be prepared by mixing together in any order the components of the composition. Any of the conventional mixing devices capable of mixing these components is acceptable. Suitable mixers include, but are not limited to, the Silverson mixer, the Cowles mixer, the Arde-Barinco mixer, the Ross mixer and the Littleford mixer.

The presently preferred mixing procedure is as follows. Petroleum hydrocarbon resin, alkadiene-vinylarene copolymer and antioxidant are added to molten asphalt at about 350° to about 400° F. in a mixer. After the copolymer is well dispersed the fillers are added to and mixed in with the mixture. The batch is then allowed to cool down to about 300° F. at which point antistripping agent is added to and mixed in with the batch.

The relative amounts of each component should generally fall within the appropriate range given in Table I. The scope of this invention, however, is not limited to the ranges recited therein. The ranges are given in terms of parts by weight per 100 parts by weight of asphalt.

TABLE I

| Parts by weight per 100 parts asphalt: | Suggested | Intermediate | Preferred |
|---|---|---|---|
| Asphalt | 100 | 100 | 100 |
| Alkadiene-Vinylarene Copolymer | 5-50 | 15-40 | 25-35 |
| Petroleum Hydrocarbon Resin | 1-20 | 5-15 | 8-12 |
| Amine-Based Antistripping Agent | 0.1-5 | 0.2-3 | 0.4-2 |
| Extender Oil | 0-50 | 15-35 | 20-30 |
| Mineral Filler | 0-100 | 20-40 | 25-35 |
| Antidegradant | 0-2 | 0.1-1.5 | 0.2-1.0 |

In the preferred embodiment of this invention the above-described asphalt composition is applied to a woven or nonwoven mat of organic or inorganic fibers. Nonwoven mats of organic fibers are preferred. Suitable organic fibers include both natural and synthetic resin fibers. The natural fibers include, for example, wool, cotton and the like. The synthetic fibers include fibers of, for example, polypropylene, polyethylene, polyester, nylons and the like. Suitable inorganic fibers include fibers of, for example, glass, carbon, asbestos and the like. The scope of this invention is not limited to the above-identified examples but broadly encompasses any fibrous mat to which a coating of the asphalt composition of this invention can be applied. Many readily available mats well known to those of skill in the art are suitable for the purposes of this embodiment of the invention. A variety of methods for producing such mats are also well known in the art.

The preferred fibrous mat is a nonwoven polypropylene fabric marketed as Petromat ® by Phillips Fibers Corporation, Greenville, S.C. The polypropylene fabric can be made from about 2 to about 5 denier staple of about 2 to about 3 inches in length. A batt of these fibers can be needle-punched and partially fused on one side by means of heated nip rolls and/or infrared fusion. The fabric, preferably about 1 to about 5 mm thick, can be coated on the unfused side with one of the asphalt compositions of this invention.

The temperature of the asphalt composition at the time it is applied to the fibrous mat should not reach temperatures which cause melting or distortion of the fibrous mat. Thus the preferred coating temperature is dependent upon the material of which the fibrous mat is constructed. Those of ordinary skill in the art possess the requisite knowledge, with respect to melting points and other relevant factors, to determine a satisfactory coating temperature for any given fibrous mat. In the preferred embodiment the polypropylene fibrous mat is coated with an asphalt composition having a temperature ranging from about 280° to about 290° F. This temperature range is sufficiently below the melting point of polypropylene to prevent melting or distortion of the mat.

Any conventional method for coating a mat or fabric with an asphalt-containing composition can be employed. Such methods lie well within the abilities of those of ordinary skill in the art. Although this invention is not limited to any particular coating method, good results can be achieved by spraying or otherwise applying the asphalt composition onto the fibrous mat. A doctor blade can be used to evenly spread the asphalt composition. Before cooling, the coated mat can be passed through calender rolls adjusted to give the desired coating gauge. Excess asphalt composition will be expelled by the calender rolls.

Without limiting the invention thereto, it is suggested that the weight ratio of asphalt composition to fibrous mat in the finished product range from about 1:1 to about 30:1. It is preferred that this weight ratio be within the range of about 5:1 to about 15:1. The most preferred weight ratio of asphalt composition to fibrous mat is about 8:1 to 10:1.

The invention is not limited by the thickness of the finished product, i.e. the coated mat, but good results are contemplated for a thickness within the range of about 50 to about 100 mils.

EXAMPLE I

In this example the preparation of three asphalt compositions which can be characterized as rubberized thermoplastic asphalt mastics are described. The components of the compositions are listed in Recipe I which gives the relative amount of each component on the basis of parts by weight per 100 parts by weight of asphalt.

| Recipe I | | | |
|---|---|---|---|
| Parts by weight per | Run 1 | Run 2 | Run 3 (Inven- |

-continued

| 100 parts asphalt: | (Control) | (Control) | tion) |
|---|---|---|---|
| Asphalt 1. | 100 | 100 | 100 |
| Copolymer A 2. | 10 | 10 | 10 |
| Copolymer B 3. | 20 | 20 | 20 |
| Silica Filler 4. | 30 | 30 | 30 |
| Aromatic Oil 5. | 20 | 25 | 25 |
| Antidegradant 6. | 0.5 | 0.5 | 0.5 |
| Petroleum Hydrocarbon Resin 7. | 0 | 10 | 10 |
| Anti-Stripping Agent 8. | 0 | 0 | 0.5 |

Footnotes:
1. Penetration of 110–130 at 77° F. (ASTM D5) and a Ring and Ball Softening point of about 120° F. (ASTM D36-76).
2. Solprene ® 411-S, a radial teleblock butadiene-styrene copolymer containing 30 weight percent bound styrene, coupled with SiCl₄, having a number average molecular weight Mn of about 220,000 and a vinyl content of about 11%, stabilized with about 0.40 weight percent of BHT (2,6-di-t-butyl-p-cresol) and 0.53 weight percent of TNPP (tris (nonylphenyl) phosphite); marketed by Phillips Chemical Company, Bartlesville, Oklahoma.
3. Solprene ® 1205-C, a linear butadiene-styrene copolymer, having a bound styrene content of about 25 percent by weight (of which 18 weight percent is present as polystyrene), a vinyl content of about 9%, and a number average molecular weight Mn of about 68,000; stabilized with about 0.40 weight percent of BHT; marketed by Phillips Chemical Company, Bartlesville, Oklahoma.
4. Ground sand of about 325 mesh particle size.
5. Sundex 790, having a specific gravity of about 0.97–0.98 and a viscosity at 210° C. of about 86 SUS, marketed by Sun Oil Company of St. Davis, Pennsylvania.
6. Vanlube ® 71, lead dialkyldithiodicarbamate, an antioxidant, and extreme pressure agent, marketed by R. T. Vanderbilt Company, Norwalk, Connecticut.
7. Escorez ® 2101, a piperylene-indene based resin having a number average molecular weight Mn of about 525, a melt viscosity (ASTM D3236) of about 300 cP at 160° C. and about 55 cP at 200° C., a softening point (Ring and Ball, ASTM E28) of 90–96° C.; and a specific gravity at 20° C. of 1.02 (ASTM D71); marketed by Exxon Chemical Americas, Houston, Texas.
8. Pave Bond AR, an anti-stripping agent containing (a) highly branched amines, primarily aliphatic and cycloaliphatic amines with molecular weights in the range of 350–400, and (b) lower molecular weight ketones, ethers and alcohols, primarily those with cyclohexyl groups; marketed by Carstab Corporation, formerly Cincinnati Milacron Chemicals, Reading, Ohio. A gas chromatogram of Pave Bond AR showed that 57% of the peak area was attributed to branched amines. An elemental analysis of Pave Bone AR showed: 75.3% C, 11.1% H, 1.2% N and 0.13% S.

The asphalt blends of Recipe I were prepared in a Silverson Model LDD laboratory mixer at about 350°–400° F. Asphalt, petroleum hydrocarbon resin (Runs 2 and 3 only), the copolymers, oil and antidegradant were blended first for about 45 minutes. Then the silica filler and the anti-stripping agent (Run 3 only) were added to the homogenous mixture, and blending continued for about 5 more minutes. Run 3 represents an asphalt composition within the scope of this invention. Runs 1 and 2 are controls.

EXAMPLE II

Coated fibrous mats made from the rubberized thermoplastic asphalt compositions of Example I and polypropylene fabric were prepared as follows. Petromat ® (marketed by Phillips Fibers Company, Greenville, S.C.) which is made of polypropylene staple fiber of about 2½ to about 3 denier and of about 2¼ inches in length was stretched, needle-punched (approximately 400 punches per square inch), and partially fused on one side by heated nip rolls to produce a fabric or mat weighing about 4 to about 6 ounces per square yard. Three coated samples, each corresponding to one of the three asphalt compositions given in Example I, were prepared in similar but separate operations using the above-described Petromat ® as follows. The fibrous mat was coated on its unfused side with one of the asphalt compositions (i.e. Run 1, 2 or 3) at a temperature of about 280° F. by means of a Gardner doctor knife to produce a coated mat having a fabric surface and a coated surface and a weight ratio of asphalt composition to fibrous mat of about 9:1. The coated mat was then covered with silicone release paper and allowed to cool in air. The thickness of the finished product was about 55 to about 60 mils.

EXAMPLE III

In this example the adhesion properties of each of the asphalt composition-coated polypropylene mats prepared in Example II were tested and described. 1"×6" strips were prepared from the coated mats. The coated side of each strip was pressed onto a cement block by means of a 1 lb roll under a pressure of about 2 psi. The adhesion of the coated polypropylene strips to the cement blocks was measured at room temperature by means of an Instron tensile tester. Two types of tests made were as follows:

1. "180° Peel Test": The entire strip is attached to the block. One of the 1" ends of the coated strip is peeled from the cement block and pulled back toward the other 1" end along a path above and parallel to the surface of the coated strip. Both the initial force required to cause separation ("ultimate peel") and the average peeling force required thereafter ("constant peel") were recorded.

2. "Shear Test": One half (i.e. 1"×3") of the coated 1"×6" strip is attached to a cement block. The strip is pulled off the block by pulling the unattached 1" end in a direction away from the attached 1" end and along a straight linear path that forms a 0° angle with the plane defined by the surface of the cement block to which the strip was attached. The force required to separate the coated strip and block in this manner was recorded.

Each strip was tested either immediately following application to a cement block or after a period of 7, 14 or 28 days during which time the block and the strip adhered thereto were kept in tap water at room temperature. The results of these adhesion tests, corresponding to each of the compositions of Example I, are summarized in Table I below.

TABLE I

|  | Run 1 (Control) | Run 2 (Control) | Run 3 (Invention) |
|---|---|---|---|
| A. Unaged: | | | |
| Peel-Ultimate, lb | 9.7 | 10.2 | 10.2 |
| Peel-Constant, lb | 8.0 | 9.2 | 9.2 |
| Shear, lb | 41.5 | 45.0 | 47.0 |
| B. Aged 7 Days in Water: | | | |
| Peel-Ultimate, lb | 3.4 | 5.0 | 11.2 |
| Peel-Constant, lb | 2.0 | 3.6 | 10.7 |
| Shear, lb | 34.5 | 27.5 | 48.8 |
| C. Aged 14 Days in Water: | | | |
| Peel-Ultimate, lb | 5.4 | 4.4 | 11.5 |
| Peel-Constant, lb | 3.8 | 3.4 | 10.7 |
| Shear, lb | 23.5 | 24.5 | 52.0 |
| D. Aged 28 Days in Water: | | | |
| Peel-Ultimate, lb | 4.2 | 3.2 | 11.5 |
| Peel-Constant, lb | 2.9 | 2.7 | 9.3 |
| Shear, lb | 29.0 | 23.0 | 52.0 |

Test data in Table I indicate the excellent results obtained by employing the composition of this invention (i.e. Run 3). In a comparison of the properties of the strips of the present invention, Run 3, with those of the strips of the control runs, Runs 1 and 2, the aged strips of the present invention gave Peel-Ultimate, Peel-Constant and Shear strengths within a range of approximately 75 to 250 percent higher than the strips of the control runs. Further there was no loss in properties of the unaged strips of the present invention compared to those of the control runs.

These results show the outstanding results obtained by employing the asphalt compositions of the present invention as coatings for fabrics to produce coated fabrics used for example in repair of concrete streets and bridges.

The examples have been given to illustrate this invention and should not be construed to unduly limit its scope. Reasonable variations from and modifications of this invention as disclosed herein are contemplated to be within the scope of patent protection desired and sought.

I claim:

1. A composition comprising (a) asphalt, (b) at least one alkadiene-vinylarene copolymer, (c) at least one petroleum hydrocarbon resin, and (d) at least one antistripping agent; wherein said antistripping agent is a highly branched organic amine.

2. A composition in accordance with claim 1 wherein said antistripping agent is a member of the group consisting of aliphatic and cycloaliphatic organic amines ranging in molecular weight from about 200 to about 500.

3. A composition in accordance with claim 2 wherein said antistripping agent comprises a mixture of (i) a mixture of said aliphatic and cycloaliphatic branched organic amines and (ii) at least one member of the group consisting of alcohols, ethers and ketones; wherein the molecular weight of each of said alcohols, ethers and ketones is less than about 200; and wherein each of said alcohols, ethers and ketones contains a cycloalkyl group selected from the class consisting of cyclohexyl and cyclopentyl groups.

4. A composition in accordance with claim 3 wherein the molecular weight of said aliphatic and cycloaliphatic branched organic amines ranging from about 350 to about 400.

5. A composition in accordance with claim 1, 2, 3 or 4 wherein said petroleum hydrocarbon resin has been derived from 1,3-pentadiene and indene monomers.

6. A composition in accordance with claim 1, 2, 3 or 4 wherein said alkadiene-vinylarene copolymer is a thermoplastic 1,3-butadiene-styrene block copolymer having a bound styrene content of about 10 to about 50 weight percent.

7. A composition in accordance with claim 6 wherein said petroleum hydrocarbon resin has been derived from 1,3-pentadiene and indene monomers.

8. A composition in accordance with claim 7 wherein said composition further comprises an extender oil and a filler selected from the group consisting of silicates, carbonates and mineral aggregates.

9. A composition in accordance with claim 1 or 2 wherein the amount of (b) is within the range of about 5 to about 50 parts by weight per 100 parts by weight of (a); wherein the amount of (c) is within the range of about 1 to about 20 parts by weight per 100 parts by weight of (a); and wherein the amount of (d) is within the range of about 0.1 to about 5 parts by weight per 100 parts by weight of (a).

10. A composition in accordance with claim 7 wherein the amount of (b) is within the range of about 25 to about 35 parts by weight per 100 parts by weight of (a); wherein the amount of (c) is within the range of about 8 to about 12 parts by weight per 100 parts by weight of (a); and wherein the amount of (d) is within the range of about 0.4 to about 2 parts by weight per 100 parts by weight of (a).

11. An article of manufacture comprising a mat coated on at least one side with the composition of claim 1; wherein said mat is comprised of fibers selected from the group consisting of natural organic fibers, synthetic resin fibers and inorganic fibers.

12. An article of manufacture in accordance with claim 11 wherein said natural organic fibers are selected from the group consisting of wool fibers and cotton fibers; wherein said synthetic resin fibers are selected from the group consisting of polypropylene fibers, polyethylene fibers, polyester fibers and nylon fibers; and wherein said inorganic fibers are selected from the group consisting of glass fibers, carbon fibers and asbestos fibers.

13. An article of manufacture in accordance with claim 11 wherein said mat is a nonwoven needlepunched fabric comprised of polypropylene fibers.

14. An article of manufacture in accordance with claim 11 wherein the ratio of the weight of said composition to the weight of said mat is within the range of about 1:1 to about 30:1.

15. An article of manufacture in accordance with claim 14 wherein said ratio is within the range of about 5:1 to about 15:1.

16. An article of manufacture comprising a mat coated on at least one side with the composition of claim 7; wherein said mat is a nonwoven needlepunched fabric comprised of polypropylene fibers; and wherein the ratio of the weight of said composition to the weight of said mat is within the range of about 8:1 to about 10:1.

* * * * *